Dec. 2, 1941.　　　T. R. HARRISON　　　2,264,370
MEASURING APPARATUS
Filed June 12, 1937　　　2 Sheets-Sheet 1

INVENTOR.
THOMAS R. HARRISON
BY *[signature]*
ATTORNEYS.

Dec. 2, 1941.　　　　T. R. HARRISON　　　　2,264,370
MEASURING APPARATUS
Filed June 12, 1937　　　　2 Sheets-Sheet 2

INVENTOR.
THOMAS R. HARRISON
BY George M. ~~~~~~~
ATTORNEY

Patented Dec. 2, 1941

2,264,370

UNITED STATES PATENT OFFICE 2,264,370

MEASURING APPARATUS

Thomas R. Harrison, Wyncote, Pa., assignor to The Brown Instrument Company, Philadelphia, Pa., a corporation of Pennsylvania Application June 12, 1937, Serial No. 147,903

4 Claims. (Cl. 235—61)

This invention relates to instrumentalities useful in the measuring and recording of variable conditions, and more particularly to mechanical relay instrumentalities for effecting adjustments under control of an element deflecting in accordance with the fluctuations of a variable condition such as flow.

It is a specific object of my present invention to provide a simple, effective and accurate device to integrate the total flow of a fluid in a pipe line. In my device the instantaneous flow values are integrated to indicate and record the total flow during any desired interval of time. A feeler cam is periodically brought into contact with a deflecting meter element and movement of the cam is transmitted to a counting device which integrates the total flow.

It is a particular object of my invention to make an integrator that takes frequent readings and quickly and positively adds them to give an accurate total without placing an objectionable load upon the primary controlling device which for the attainment of measuring sensitivity and accuracy must necessarily be free from friction and instrument adjustment loads.

It is a further specific object of this invention to provide an integrating mechanism which will accurately integrate the total flow of the fluid being measured through the entire range of the instrument from one hundred percent down to zero flow.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Figure 1 of the drawings is a front view of the device with certain parts broken away to more clearly show the mode of operation.

Figures 1, 2:
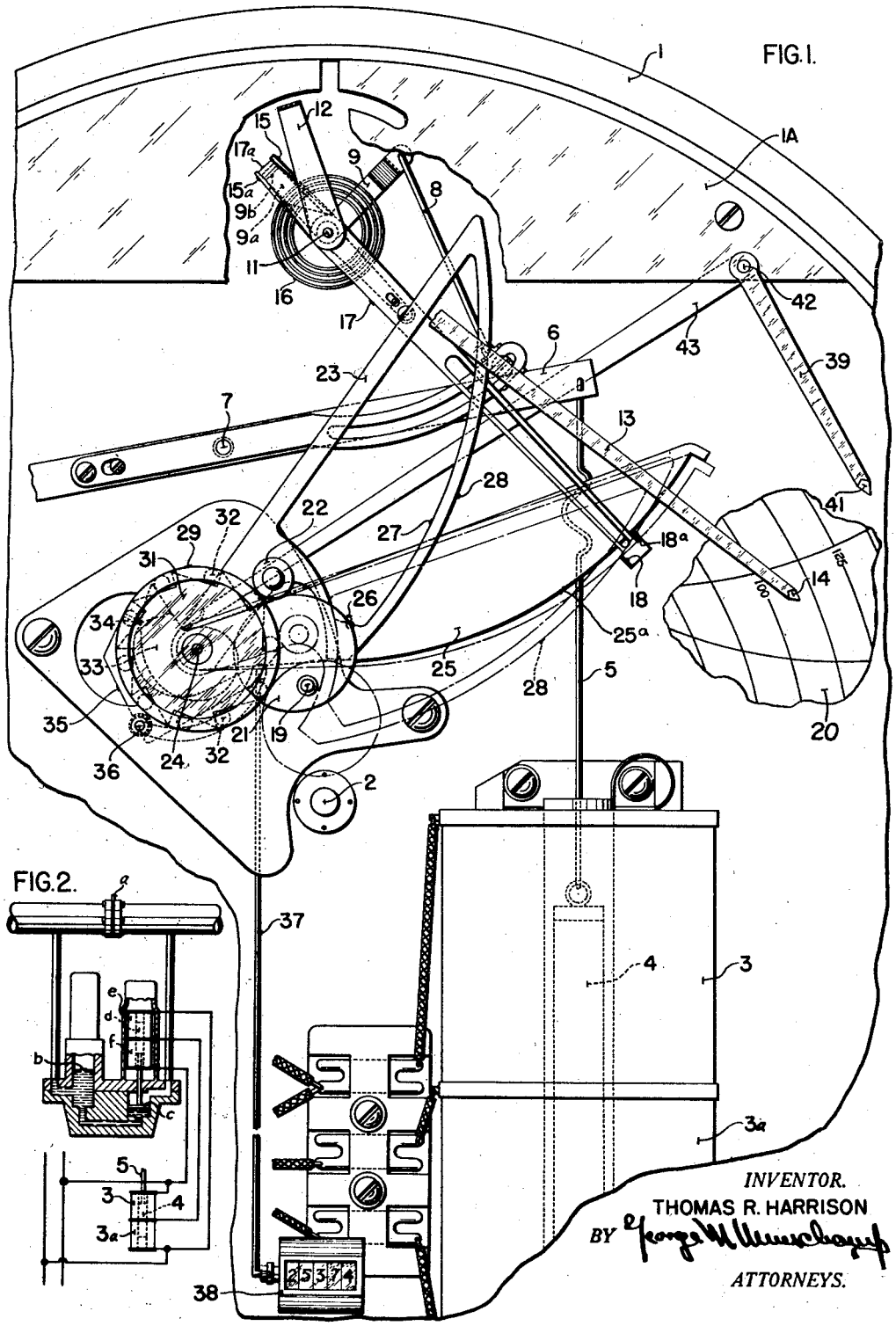
Figure 2 is a diagrammatic showing of the instrument control.
Figure 3:
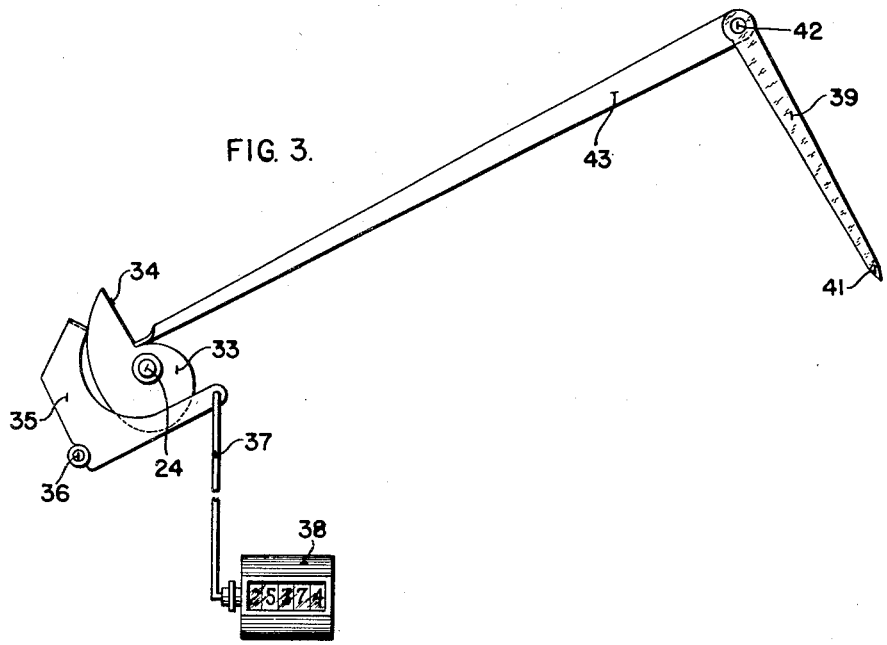
Fig. 3 is a view of the measuring cam and levers actuated thereby.
Figure 4:
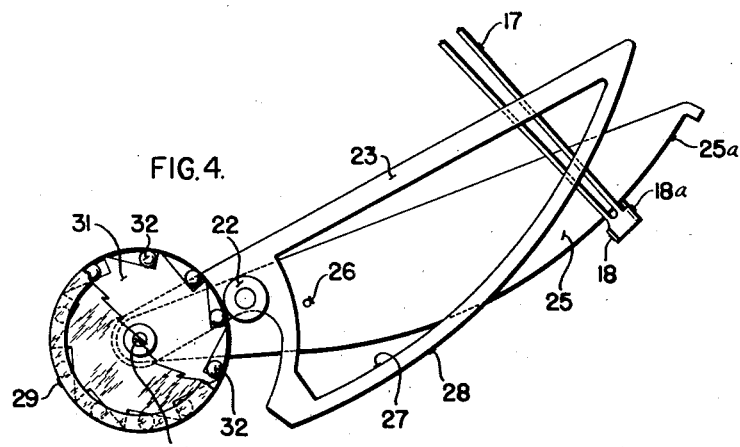
Fig. 4 is a view of the clutch, integrating cam and brake which normally lie in front of the parts shown in Fig. 3.
Figure 5:
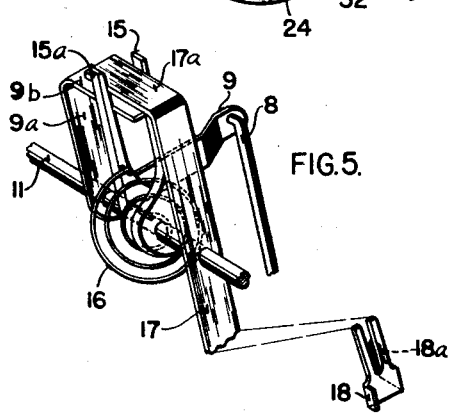
Fig. 5 is a perspective view of the mechanism at the top of Fig. 1.

Although equally useful in connection with mechanical and other electrical types of flow metering systems, my invention is here illustrated as adapted for use in the Brown electric flow meter which is now in wide commercial use and which is disclosed in my prior Patent 1,743,852 granted January 14, 1930. In this system the differential pressure across an orifice $a$ inserted in the pipe line, of a fluid, the rate of flow of which is to be measured, is impressed upon the sealing liquid $b$ of a U-tube manometer the level of the liquid in either leg of the manometer forming a measure of fluid rate of flow. A float $c$ in the liquid in one manometer leg rising and falling with the sealing liquid level carries an armature $d$ adapted to cooperate with inductance coils $e$, $f$ forming the transmitting element of a distant reading system. The distant reading system includes receiving coils 3, 3a electrically connected to the transmitting coils $e$, $f$ and inductively related to a receiver armature 4 which as more fully described in my previously mentioned prior patent is thereby given movements corresponding to the movements imparted to the armature $d$ by the manometer float.

The receiver coils 3, 3a are included in a recorder-integrator instrument of circular form provided with a casing 1 and a chart driving hub which is fixed to a shaft 2 and is rotated at a constant speed by a motor (not shown) making a full revolution in any desired period of time, such as once in twenty-four hours. An upper segment plate 1A cooperates with a lower segment (not shown) to form a closure plate for the front of the instrument casing and to form a bearing plate for a chart which may be mounted on and rotated by the chart hub. The chart hub together with the recorder pens project through the closure plate and the mechanism now to be described is enclosed within the casing and in back of said plate. Armature 4 is connected by a link 5 to a lever 6, pivoted on stud 7, and lever 6 is attached by a short link 8 to a lever 9 which is in turn fastened to and turns shaft 11. The shaft is mounted for turning movement in the casing for rotation of a yoke 12 attached thereto which is formed with a pen arm 13 having a pen 14 on its lower end. The pen 14 is adapted to indicate and/or record on a chart 20, having conventional record lines, the existing flow value. It will be seen from the above described connections that every movement of the armature 4 is accurately transmitted to the pen 14 so that as the chart rotates, a line will be made upon it giving the instantaneous value of the flow being measured.

Loosely journalled upon shaft 11 are the two arms 15 and 15a each one of which is attached to an end of spiral spring 16, the latter tending to move arms 15 and 15a toward each other and into engagement with opposite sides of the upper transverse projection 17a of a selector arm 17 loosely mounted on the shaft 11. Lever 9 is made in the form of a bell crank lever having an arm 9a which is provided with a transverse projection 9b parallel to and of the same width as the projection 17a of lever 17. Projections 9b and 17a are thereby urged into alignment by the action of arms 15 and 15a so that arm 17 normally shares the angular movement of lever 9 but is permitted relative movement thereto when prevented from moving as later described. The lower end of arm 17 is formed with two transverse edges 18 and 18a the former of which extends forwardly and the latter of which extends rearwardly of the plane of arm 17 for a purpose to be later described.

Journalled in the casing is a cam shaft 19, driven from the same motor that drives the shaft 2, but at a much faster rate; say one revolution every six seconds. Fastened to shaft 19 is a cam 21 serving to periodically raise a roller 22 which is attached to integrating cam 23, pivoted on shaft 24. The cam is normally biased in a clockwise direction by its own weight, but its skeleton form makes it very light. Also pivoted on shaft 24 is a brake member 25, having a brake edge 25a arranged to engage edge 18a of lever 17 and hold the latter against movement as shown in dotted lines in Fig 1. Member 25 is normally biased in a clockwise direction by its own weight and a small spring (not shown) and has a fairly tight fit on shaft 24 so that any movement of the member will tend to move the shaft but rotation of the shaft is not able to move the member 25 since the fit on the shaft 24 is not tight enough to overcome the force of the spring and the weight of the member. The lower edge 25a of the brake is formed as the arc of a circle the center of which is the shaft 11 when this edge is in contact with edge 18a of arm 17. As the integrating cam rises and falls the brake is lifted slightly by the contact of pin 26 on brake member 25 with the inner edge 27 of the cam 23, the contact occurring as the integrating cam nears the upper end of its stroke thereby lifting the brake 25 off of the edge 18a. Arm 17 is thus released to move to a position determined by lever 9. Both the integrating cam 23 and brake 25 are shown at the upper limit of their movement in the full lines of the drawing and as the cam 21 continues its rotation, the brake and the integrating cam drop. When the brake 25 engages the edge 18a it holds lever 17 against movement and the integrating cam continues to move downwardly until its graduated edge 28 contacts the edge 18. The cam 21 continues its rotation until it again contacts roller 22 and the cycle is repeated. The dotted lines in the drawings indicate the lowest positions, for the particular setting of arm 17, of the integrating cam 23 and the brake 25. It should be noted that in the dotted line positions the roller 22 is not contacting cam 21 so that the integrating cam and brake will be sure to reach the lowest position possible for any setting of arm 17.

The cam 23 is thus periodically raised to a fixed position once in each cycle of operation and thereafter is permitted to fall to a position determined by the then value of the flow, the variable travel of the cam being a measure of flow during that cycle. In order to integrate the successive excursions of cam 23, the latter is provided with counting mechanism including a clutch, here shown as a ball clutch. Rigidly attached to the integrating cam 23 is an outer section 29 of a one-way ball clutch, the inner section 31 of which is rigidly mounted on shaft 24. This inner section has the shape of a ratchet and mounted in between each tooth is a ball 32. Upon counterclockwise movement of the outer section 29 of the clutch, the balls 32 are cammed against the ratchet teeth of the inner section 31 and the inner section is thus rotated. Upon clockwise rotation of 29 the inner section 31 does not rotate, since the balls are turned away from wedging engagement therewith and move back against the face of the next adjacent tooth. The friction on shaft 24 is sufficient to prevent it from rotating except by a positive force. Thus as the integrating cam 23 moves upwardly, or in a counterclockwise direction, the shaft 24 is rotated, the amount of rotation depending upon the lowest position assumed by integrating cam 23 when it contacted edge 18 on arm 17.

It will be seen that at very low percentages of flow that the oscillatory movement of cam 23 will be small, but some movement thereof is necessary even at zero flow in order that lever 17 may be freed to move to a new position. As cam 23 and brake 25 start their downward or clockwise movement, the shaft 24 and inner part 31 of the clutch are also moved until the brake 25 engages the edge 18a of arm 17. This reverse movement of the shaft 24 and clutch part 31 is due to the abovementioned tight fit of the brake member on the shaft. Therefore the counter-clockwise movement of part 31 after brake 25 starts to move is subtracted as the brake returns to its active position. The effective counter-clockwise or additive movement of clutch part 31 is therefore only that which it has between the time cam 23 starts to move and the time the brake 25 starts to move. Because of this arrangement the cam 23 may be lifted from the edge 18, to free the lever 17, when the latter is in its zero position, without imparting a false movement to the shaft 24. This feature is of importance since it does away with the necessity of a double lever for actuating the integrating mechanism such as is disclosed in my Patent 2,121,082 dated June 21, 1938, and also because integration can accurately be accomplished down to zero flow which would not be the case if shaft 24 did not move with member 25.

Also rigidly mounted on shaft 24 and back of the clutch parts is a counting cam 33 having a rising edge terminating in a radial surface 34. Bearing on the circumference of the counting cam 33 is one arm of bell-crank lever 35 which is pivoted at 36. This lever is normally biased in a clockwise direction by its own weight and that of link 37 attached thereto, although a spring may also be used to increase this biasing effect if desired. As the inner section of the clutch rotates it turns shaft 24 and counting cam 33, and the latter gradually turns bell-crank 35 counter-clockwise until the arm of the bell-crank reaches radial surface 34. The bell-crank then moves clockwise under its own weight as above explained. The oscillatory movement of the bell-crank reciprocates a link 37 which is attached at its lower end to an ordinary form of counter 38 which is thereby actuated. The parts of the device are so proportioned that the movement of the integrating cam 23 when transmitted to the counter 38 will give an accurate integration of the flow of the measured fluid.

For providing a chart record of the total or integrated amount of fluid measured during a given time, an arm 39 having pen 41 is provided. Arm 39 is fastened to shaft 42 to which is also fastened a lever 43. The other end of this lever bears on the surface of counting cam 33 so that as the cam rotates pen 41 is given a jog on the chart, one for each revolution of cam 33. The mark made by pen 41 will necessarily have to be a zig-zag one and counting the number of jogs on this line will give the total flow.

It is thus seen that due to the frequent measurements taken by integrating cam 23 and the positive manner that these measurements are transmitted to the counter that the integrating is substantially continuous and is accurate within extremely narrow limits. The relative simplicity of the mechanism, and the arrangement of the parts such that lost motion and clearances are eliminated or are prevented from introducing errors, permit easy manufacturing of my device and contribute to its long life in practice with a minimum of maintenance.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a measuring instrument, the combination with an element movable in accordance with variations in the value of a condition, a feeler to engage said element, means to periodically engage and disengage said feeler and element, a brake for said element, means operated by said feeler to apply and release said brake, a shaft, connecting means between said feeler and shaft and between said brake and shaft whereby said shaft is rotated proportionally to the relative movement of said feeler and brake during each period.

2. In a measuring instrument, the combination with an element movable in accordance with variations in a measurable condition, a shaft, a feeler, means to effect cyclic engagement between said feeler and element, a brake for said element, means operated by said feeler to effect cyclic braking engagement between said brake and element, means connecting said feeler and shaft so that movement of said feeler in one direction will move said shaft, and means connecting said brake and shaft so that movement of said brake in both directions will move said shaft whereby the resulting rotation of said shaft is proportional to the relative movement of said brake and feeler.

3. In a measuring instrument, the combination of a shaft to be rotated, a member to rotate said shaft, a one-way drive connection between said member and shaft, a second member also connected to said shaft, means to move said first member and through said first member said second member a smaller amount in opposite directions whereby said shaft will be rotated in one direction an amount equal to the amount of movement of said first member and in the opposite direction an amount equal to the amount of movement of said second member.

4. In a measuring instrument, the combination of a shaft to be rotated, a one-way clutch having driving and driven elements to drive said shaft, a continuously oscillated member to move the driving element of said clutch, a second member frictionally mounted on said shaft, connecting means between said members whereby the second member is driven by the first member through a portion of the movement of the latter, the parts cooperating so that said shaft will be driven in one direction by said first member and a smaller amount in both directions by said second member.

THOMAS R. HARRISON.